United States Patent [19]
Peterson

[11] Patent Number: 5,562,555
[45] Date of Patent: Oct. 8, 1996

[54] ADJUSTABLE FLYWEIGHTS FOR VARIABLE SPEED BELT DRIVE

[76] Inventor: Lonn M. Peterson, 18041 Dove Hill Rd., Eden Valley, Minn. 55329

[21] Appl. No.: 451,199

[22] Filed: May 26, 1995

[51] Int. Cl.$^6$ .................................................. F16H 59/36
[52] U.S. Cl. ..................................... 474/14; 192/105 CD
[58] Field of Search .................................. 474/8, 10, 14; 192/3.31, 105 CD

[56] References Cited

U.S. PATENT DOCUMENTS

| | | | |
|---|---|---|---|
| 3,727,478 | 4/1973 | Erickson et al. | 474/14 |
| 3,939,720 | 2/1976 | Aaen et al. | 474/14 |
| 3,951,224 | 4/1976 | Beaudoin et al. | 474/14 X |
| 3,962,927 | 6/1976 | Beaudoin et al. | 474/14 |
| 3,962,928 | 6/1976 | Beaudoin et al. | 474/14 |
| 3,971,263 | 7/1976 | Beaudoin et al. | 474/14 |
| 4,095,479 | 6/1978 | Lundberg | 474/14 X |
| 4,826,467 | 5/1989 | Reese et al. | 474/14 |

*Primary Examiner*—Roger J. Schoeppel
*Attorney, Agent, or Firm*—David George Johnson

[57] ABSTRACT

A variable speed belt drive (1) having adjustable mass and moment of inertia camweights (40, 56) is shown for use primarily in conjunction with snowmobile, golf cart, all terrain vehicle and small automobile engines. In one version, the camweight (40) includes a series of perforations or score lines (47, 48, 49) surrounding a cross section of the camweight arm (45). The perforations define a volume that may be snapped or cut off of the arm (45) with a suitable tool. Also, a series of bores (52, 53, 54) are formed through the arm (45). In order to increase the mass of the arm (45), a molten metal or similar flowable material may be poured into one or more of the bores (52, 53) and allowed to cure. In another version of the invention, a reduced cross section arm (59) serves as a base onto which shims (64, 65, 66) are added or reoriented in order to achieve the desired mass and moment of inertia characteristics.

10 Claims, 8 Drawing Sheets

ADJUSTABLE FLYWEIGHTS FOR VARIABLE SPEED BELT DRIVE

BACKGROUND OF THE INVENTION

1. Field of the Invention

This invention relates generally to the clutch of a variable speed belt drive, and more particularly to a flyweight for use in a clutch that permits adjustment of the flyweight mass and moment of inertia without the need to remove the flyweight from the driving clutch.

2. Description of Related Technology

A variable speed belt drive is a type of transmission commonly used with internal combustion engines developing fifty to two hundred horsepower at shaft speeds of approximately 10,000 revolutions per minute. Such belt drives are commonly used on snowmobiles, and permit operation from low velocities to speeds of over 100 miles per hour. The belt drive typically includes a driving clutch having a shaft which is coaxial with the output shaft of the vehicle's engine. The driving clutch is formed to include a stationary and a fixed sheave, which together define a pulley around which a belt may travel. The belt also includes travel around a driven clutch pulley that transfers the engine's power to the output shaft driving the vehicle.

An example of a variable speed belt drive of this type is disclosed in U.S. Pat. No. 3,939,720, issued to Aaen et al. The effective radius of both the driving pulley and the driven pulley may be varied, and it is the ratio of the driving pulley radius to the driven pulley radius which determines the ratio of engine speed to the output shaft rate of rotation. If the driving pulley radius is small as compared to the driven pulley, the output shaft will turn at a rate that is slower than the engine speed, resulting in a low vehicle speed. As the ratio of the driving to driven pulley radius approaches 1:1, the output shaft speed will be approximately equal to the engine speed, and the vehicle speed will be relatively greater. Finally, as the driving pulley radius becomes greater than the driven pulley radius, an overdrive condition occurs in which the output shaft is turning at a rate which is greater than the crankshaft of the engine.

Ideally, an engine will deliver power in a linear manner and the transmission will deliver all of the available engine power regardless of the vehicle's speed or load. Unfortunately, that is not the case with either real world engines or transmissions. Instead, the typical engine delivers its maximum power over a narrow range or band of high crankshaft speeds, with power falling off measurably on either side of that band. Ideally, the transmission should permit the engine to operate within that band regardless of the load on the engine. Typically, the maximum "power band" has a range on the order of 100 rpm.

In a variable speed belt transmission, the effective radius of both the driven clutch and the driving clutch are variable and can move while the engine is under power. The driven clutch relies on the combination of a pretension spring and a helical torque feedback ramp to exert the required pressure on the movable pulley sheave to maintain the optimum side load on the belt. While the correct design and adjustment of the driven pulley sheaves determines the efficiency of the transmission system by properly transferring to the output shaft the engine power that is made available to it, the driving clutch must control the engine speed and keep the engine operating in the "power band" throughout the entire operating range of the transmission.

The driving clutch varies its effective radius by having a movable sheave that decreases the distance between the tapering sheaves and thus increases its effective radius as the engine speed increases. Movement of the movable sheave occurs because of the force exerted by one or more flyweights that alter their orientation in response to the centripetal force caused by rotation of the engine. The mass of the flyweight and its moment of inertia are critical to establishing operation of the engine within the "power band". If the flyweight is too heavy, light or not properly balanced in its dynamic state, the driving clutch will not be delivering maximum power to the driven clutch, but will instead be operating above or below the "power band".

Further, once the proper flyweights are chosen, variations over time in the engine output, transmission efficiency or vehicle configuration will cause the power band to shift, thereby requiring the replacement of the flyweights. Replacement of the flyweights presents several problems. First, the construction of the movable sheave housing requires that the driving clutch be substantially disassembled in order to replace the flyweights. Second, there is no readily available method of determining what change to the flyweights is required to achieve the desired result. Hence, one of many fixed weights must be inserted and the clutch reassembled. The vehicle must then be test driven in order to determine if the change in flyweights was helpful. Even if that were the case, there is no way of determining if the substitution of flyweights achieved the optimum results, and so additional disassembly, substitution, reassembly and testing is required. The entire process is so time consuming that it is seldom properly performed, with the result that most snowmobiles, for example, are not actually operating within ten percent of their power band. The resulting inefficiency also causes excess fuel and oil consumption.

Finally, the sheer number of manufacturer supplied flyweights makes it unlikely that a complete supply will be on hand when needed. For example, on page 57 of the *Clutch Tuning Handbook* by Olav Aaen, 1995 edition published by Aaen Performance, 316 Sheridan Road, Racine, Wis. 53403, shows thirty four separate drive clutch weights that are available for a popular commercial unit. These weights are available in tolerances of ±1 gram, meaning that a 50 gram weight could weigh less than a stock 49 gram weight. Also, the thirty four weights represent a variety of shapes and thus moments of inertia, all of which must be tried empirically in order to approach, but not necessarily achieve, optimum performance.

The ideal solution to this problem is to adjust, rather than replace, the existing flyweights while they are still in place on the clutch. One attempt at this approach has been made in the Yamaha YPZ clutch, as discussed on page 58 of the *Clutch Tuning Handbook*. Unfortunately, the Yamaha approach is limited to the addition of washers on a flyweight of fixed shape. The size of the washers is such that only small changes in weight and moment of inertia can be achieved, and the system assumes that the subtraction of mass from the original flyweight will not be desired.

SUMMARY OF THE INVENTION

The present invention addresses the problem of altering the mass and moment of inertia of flyweights used on a variable speed belt drive whether or not the flyweights are still mounted on the clutch. The flyweight or camweight of the present invention uses a relatively low mass parent weight arm to which numerous shims and ballast of varying shapes and mass may be quickly added or subtracted. The total mass of the weight arm may be left unchanged while the moment of inertia is varied, the mass itself may be varied without affecting moment of inertia, or a combination of mass and moment of inertia variation may be utilized. The weight arm is formed to include several threaded holes into which fasteners may be secured. The fasteners may be formed in different shapes and may have differing densities and masses. Thus, in some cases the fasteners by themselves may be sufficient to properly tune the clutch. In other cases, the use of shims having various shapes and masses may be secured to the weight arm with the fasteners. The shims may also be moved to occupy different positions on the weight arm. Tuning of the clutch can be accomplished rapidly in the field and immediate testing of various camweight configurations can be conducted. In this manner, optimum tuning of the clutch can be accurately and inexpensively achieved, whereas prior tuning methods are so labor intensive and time consuming that the precise engine parameters are not easily verified and altered, thus resulting in tuning outside of the optimum range.

DETAILED DESCRIPTION OF THE PREFERRED EMBODIMENTS

Figure 1:
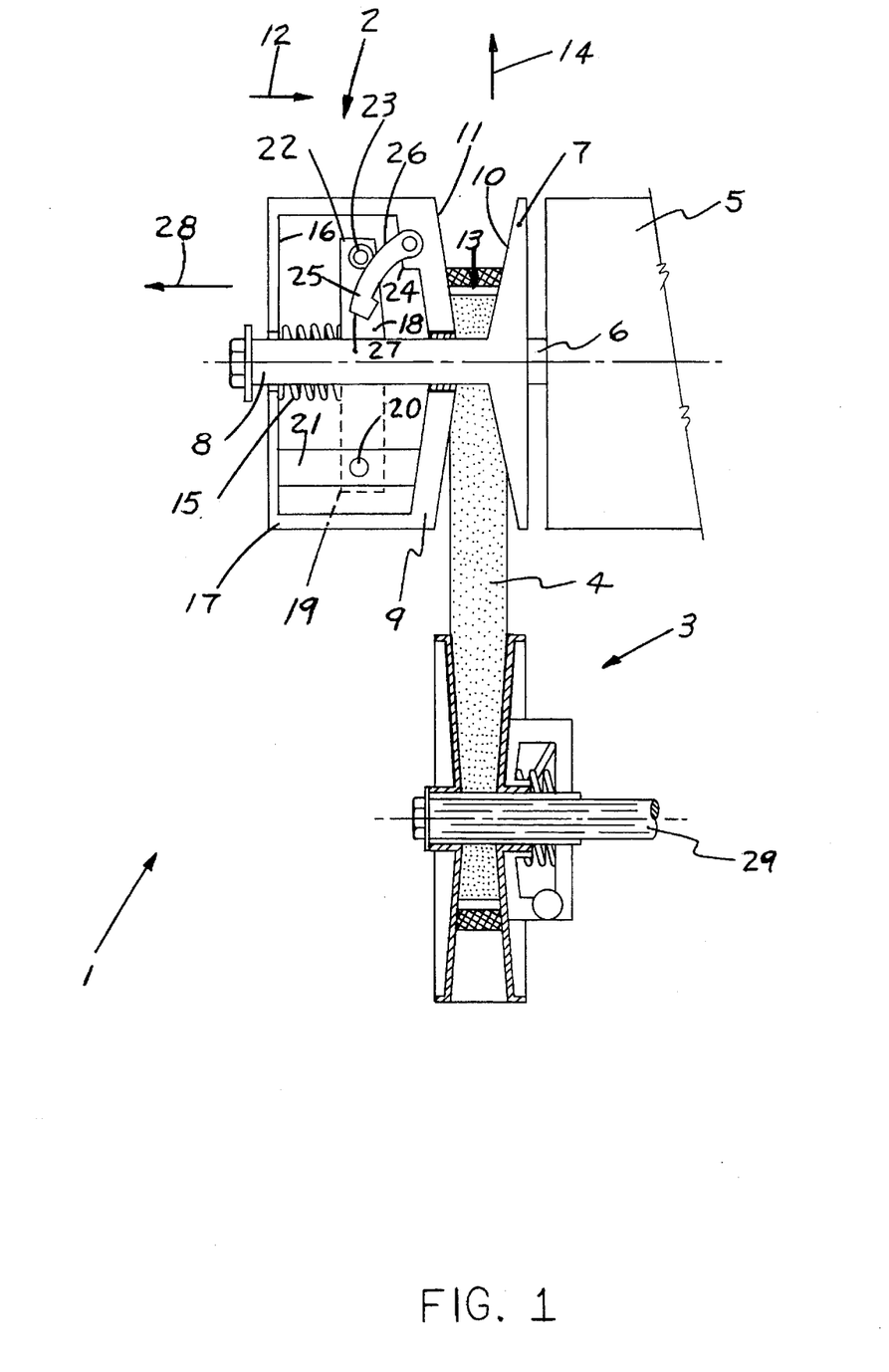
FIG. 1 is a side sectional view showing a variable speed belt drive employing an adjustable camweight constructed according to the principles of the present invention.

A variable speed belt drive 1 is shown generally in FIG. 1. The belt drive 1 includes a driving clutch assembly 2, a driven clutch assembly 3 and a flexible belt 4 extending between the two clutch assemblies 2 and 3. An engine 5 drives a crankshaft 6 which is rigidly attached to a fixed sheave 7. The fixed sheave 7 is formed to include a slanted outer wall 10. The fixed sheave 7 is rigidly connected to a shaft 8 upon which is mounted a movable sheave 9. The movable sheave 9 is also formed to include a slanted outer wall 11. Thus, as the outer wall 11 of movable sheave 9 travels in the direction of arrow 12, the region 13 of belt 4 that resides between the slanted walls 10 and 11 is forced outwardly in the direction of arrow 14. This movement of region 13 has the effect of increasing the effective radius and hence the circumference of the path along which the belt 4 must travel.

Travel of the movable sheave 9 is attributable to several factors. First, a pressure spring 15 resides between inner wall 16 of the movable sheave housing 17 and the spider tower 18. The spider tower 18 has a lower end 19 to which is attached a pivotable torque transfer button 20. The torque transfer button 20 is free to slide along a bearing surface 21 in response to the resultant force exerted by components including the pressure spring 15.

The movable sheave housing 17 is formed so as to include an inner surface 24 which is the surface underlying the outer wall 11. Pivotably mounted to the inner surface 24 is a camweight 25. The upper end 22 of the spider tower 18 is formed to include a pivotable spindle 23 which abuts the outer surface 26 of the camweight 25. As the crankshaft 6 rotates at a given rate, the movable sheave 9 rotates at the same rate. As the rate of rotation increases, the free end 27 is flung outwardly, generally in the direction of arrow 28. This outward movement of the camweight 25 causes the camweight surface 26 to exert a force against spindle 23, thereby urging the spider tower to move in the direction of arrow 28 and creating a reaction force against inner wall 24 that acts in the direction of arrow 12. When the urging force of the camweight is greater than the opposite force exerted by pressure spring 15, the separation between sheave outer walls 10 and 11 decreases, thereby increasing the path length traveled by belt 4. The belt 4 thus transfers a variable rate of rotation to the drive clutch assembly 3, and thereby transfers the rotation of crankshaft 6 to the vehicle drive or output shaft 29.

Figure 2:
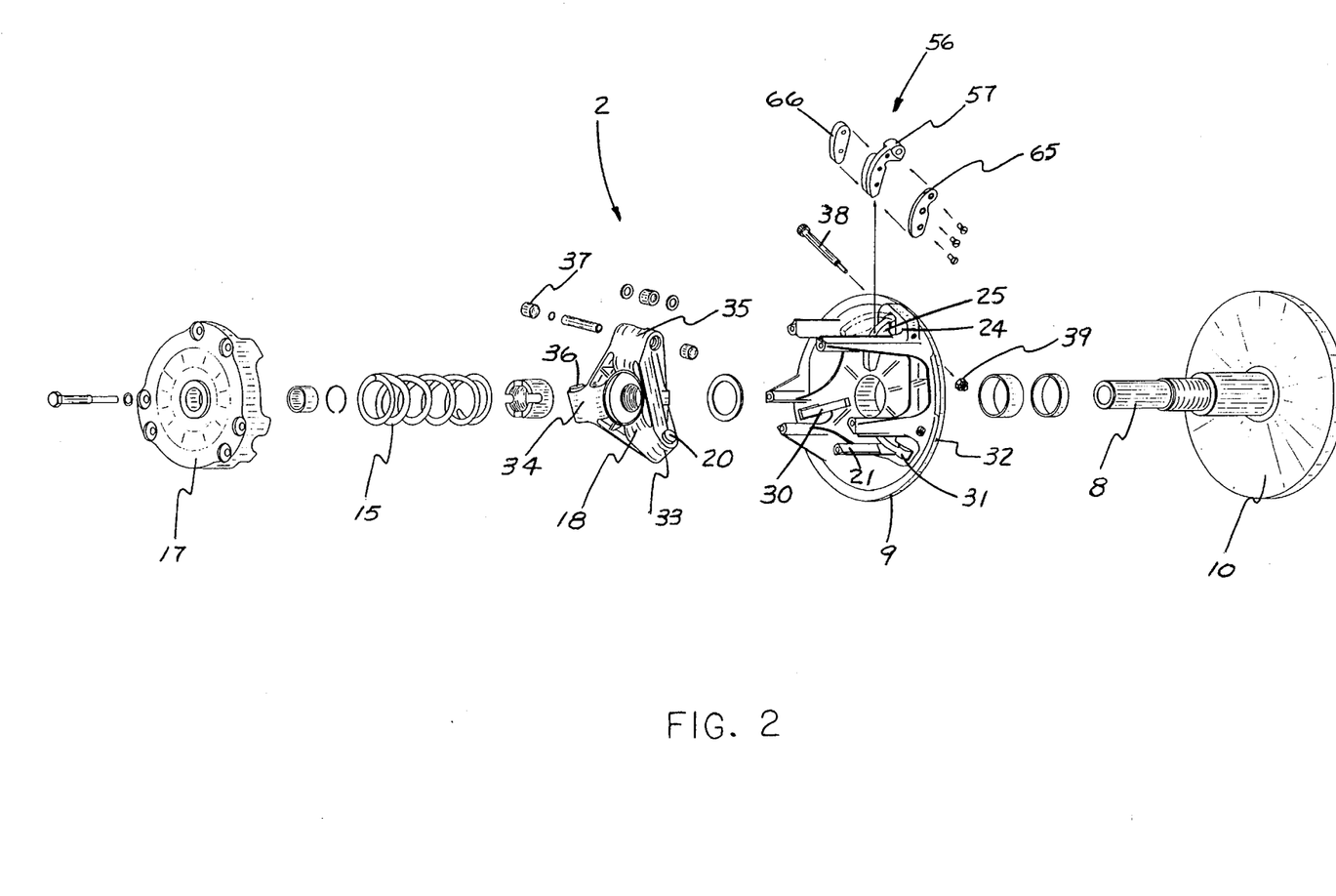
FIG. 2 is an exploded view of the driving clutch assembly depicted in FIG. 1.

Referring now to FIG. 2, additional details concerning the construction of driving clutch assembly 2 will be apparent. Most significantly, the movable sheave 9 is formed to include three substantially identical pivotable camweights 25, 30 and 31, which are mounted at 120° spacings within the circumference 32 of movable sheave 9. The spider tower 18 includes three distinct lobes 33, 34 and 35, each of which is formed to include a discrete torque transfer button 20, 36 and 37, respectively. Each of the lobes is acted on by a separate camweight. Therefore, camweight 25 acts against lobe 35, camweight 31 acts on lobe 33 and camweight 30 acts against lobe 34. In alternate designs, the spider tower may include, for example, four distinct lobes, thereby requiring 90° spacings of the camweights. One can appreciate that each of the camweights 25, 30 and 31 should have virtually identical characteristics in order to achieve proper dynamic balance during engine operation. In order to remove the actual camweight 25, for example, the bolt 38 and nut 39 must be removed. A similar operation must occur for the remaining two camweights 30 and 31, and then each weight must be replaced and the nuts and bolts refastened.

Figure 3:
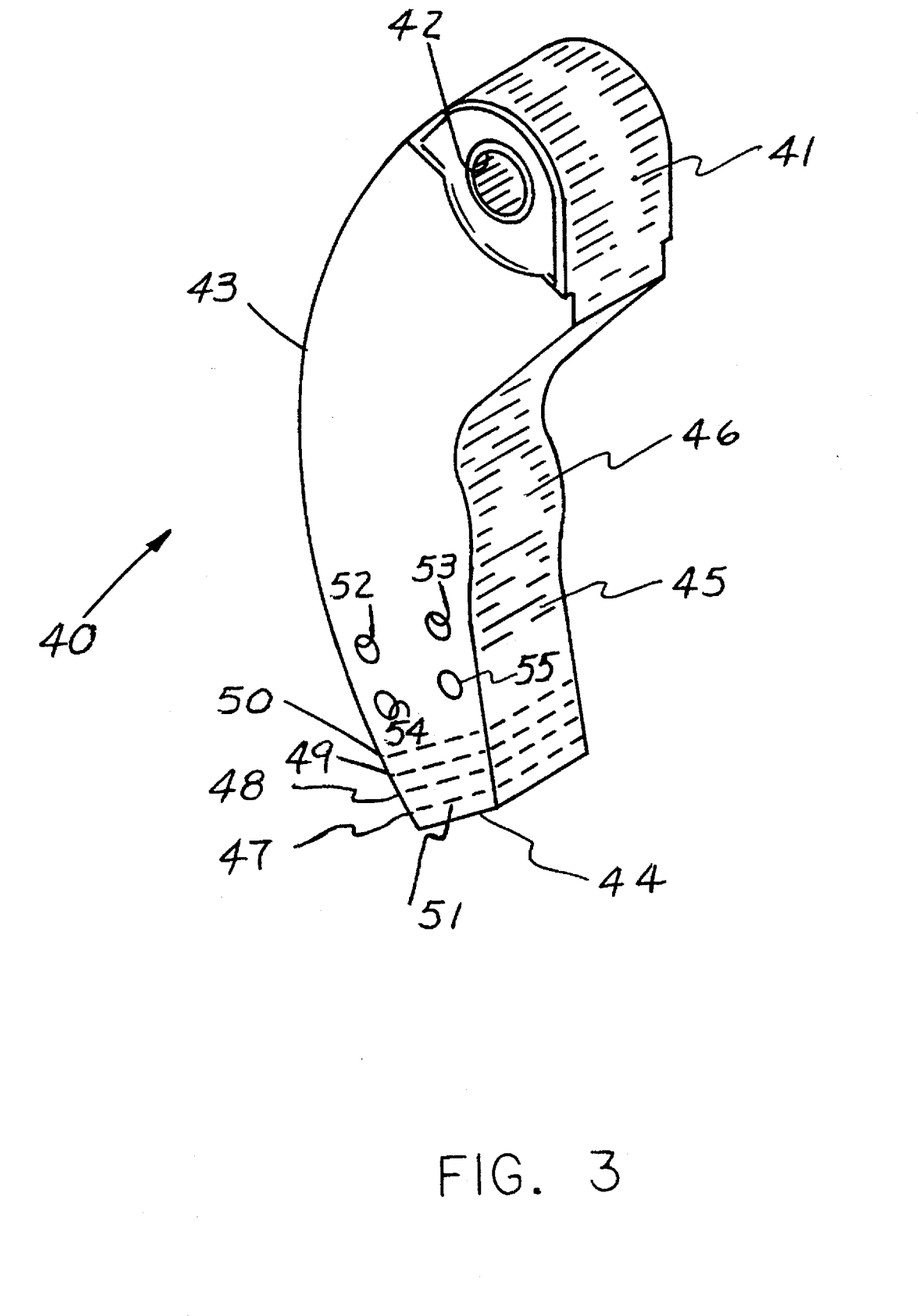
FIG. 3 is a perspective view of a first embodiment of a camweight constructed according to the principles of the present invention.
Figure 4:
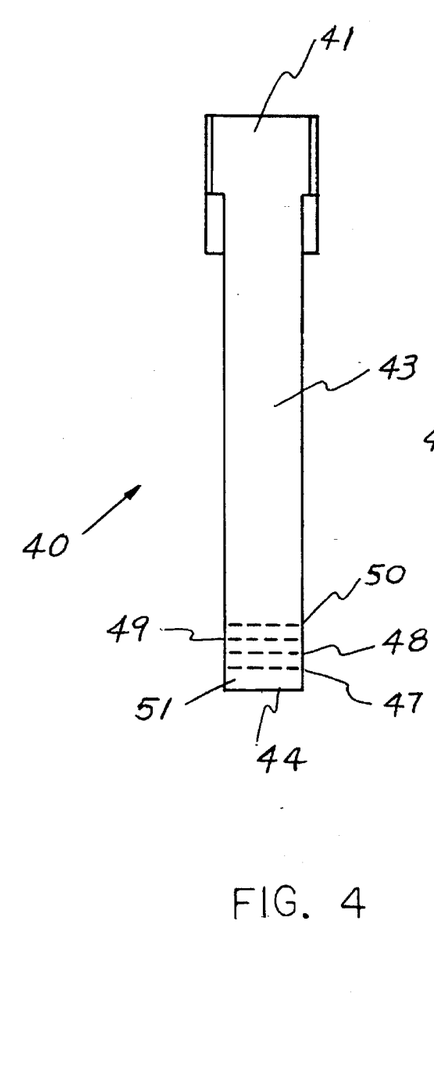
FIG. 4 is a is rear elevation of the camweight depicted in FIG. 3.
Figure 5:
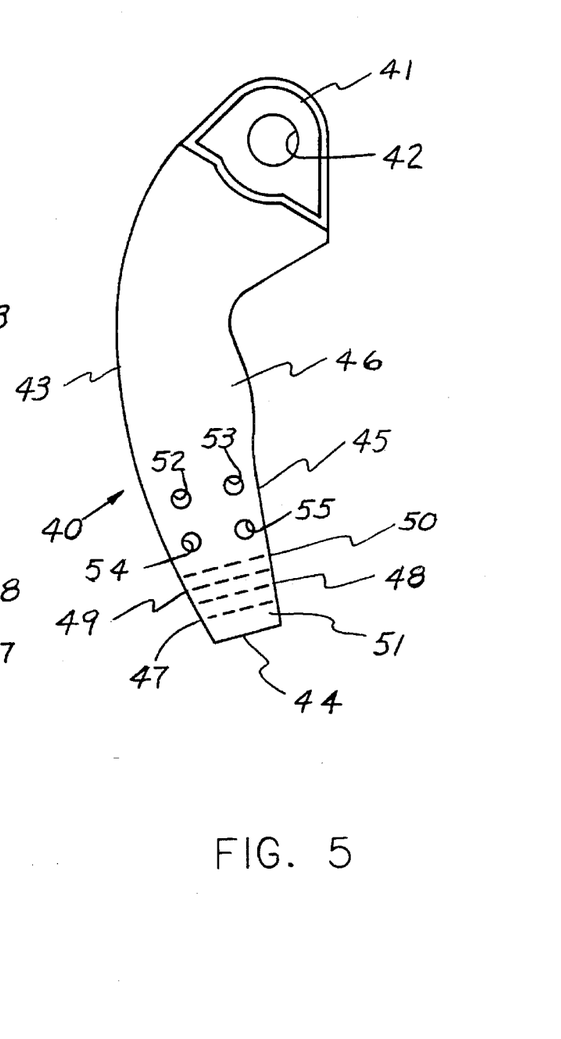
FIG. 5 is a side elevation of the camweight depicted in FIG. 3.
Figure 6:
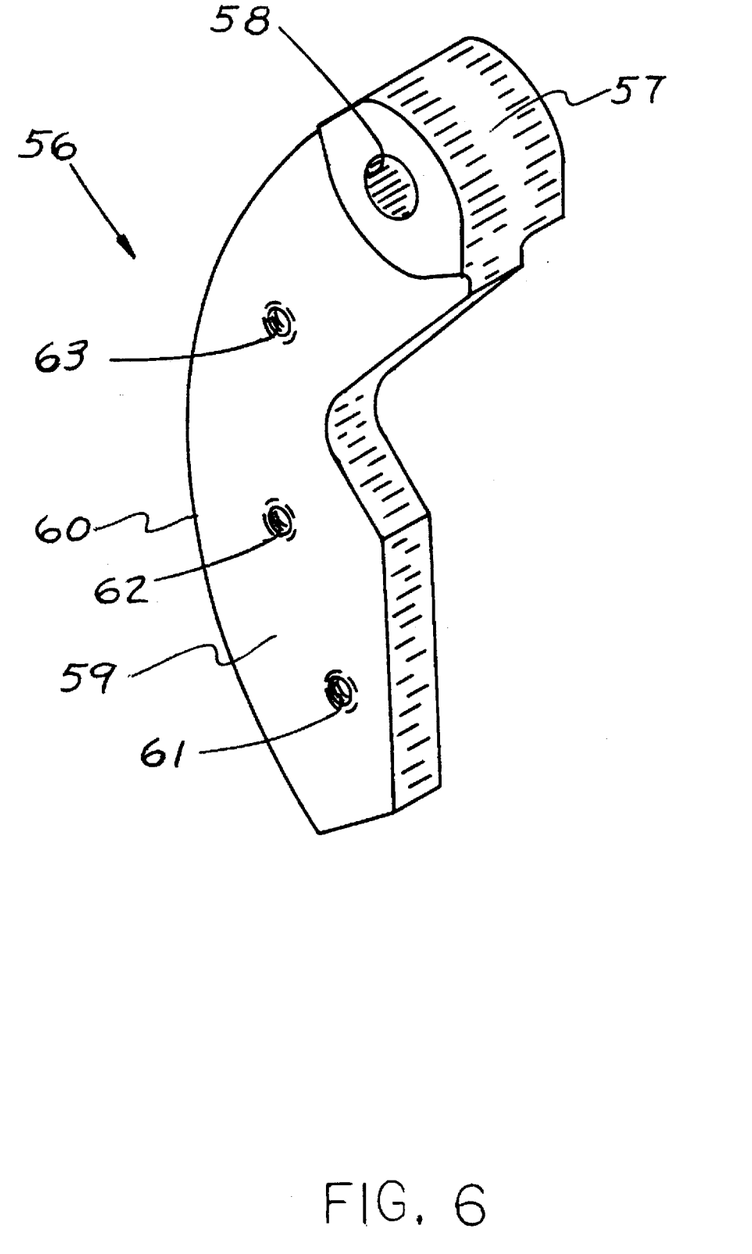
FIG. 6 is a perspective view of a second embodiment of a weight arm constructed in accordance with the principles of the present invention.
Figure 7:
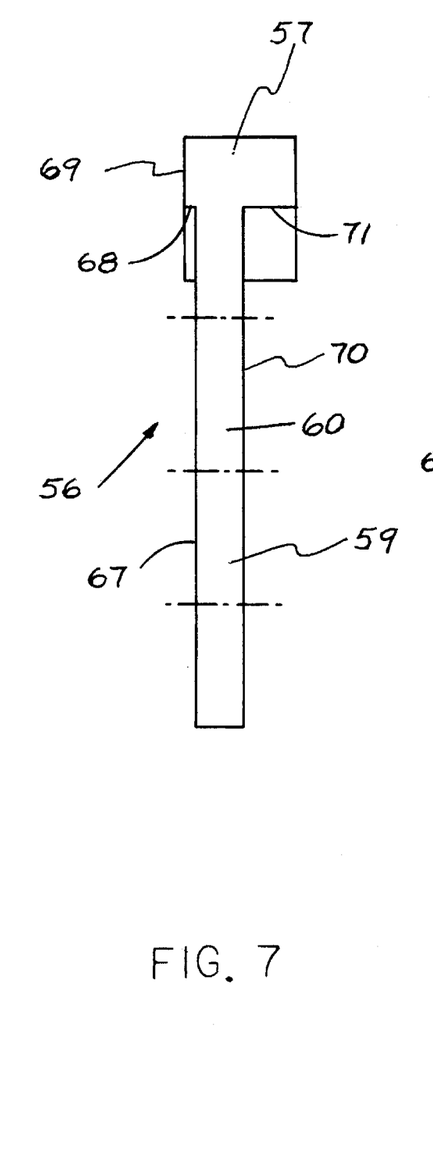
FIG. 7 is a rear elevation of the weight arm depicted in FIG. 6.
Figure 8:
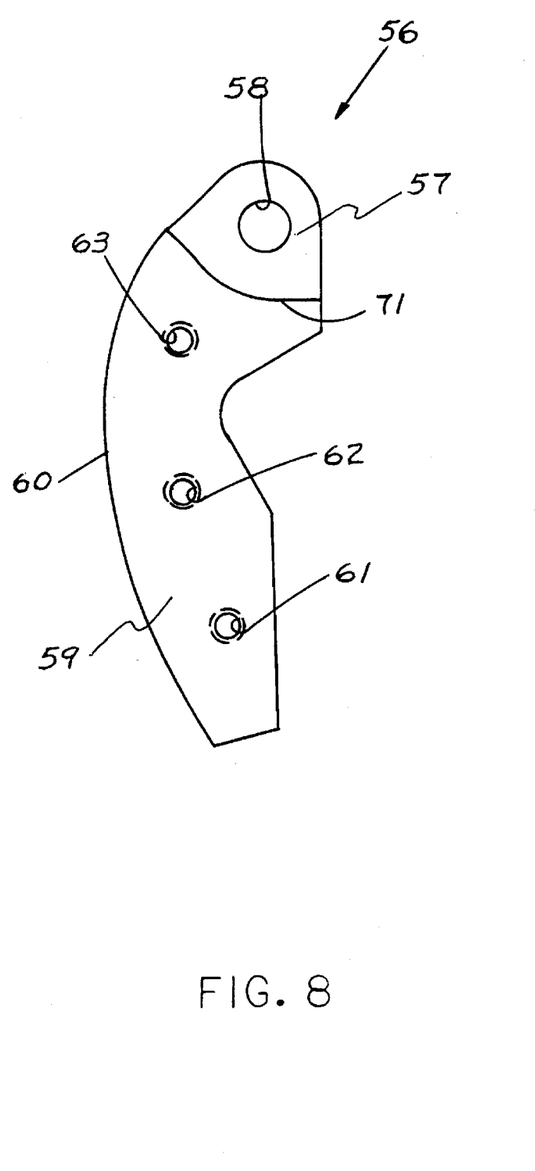
FIG. 8 is a side elevation of the weight arm depicted in FIG. 6.
Figure 9:
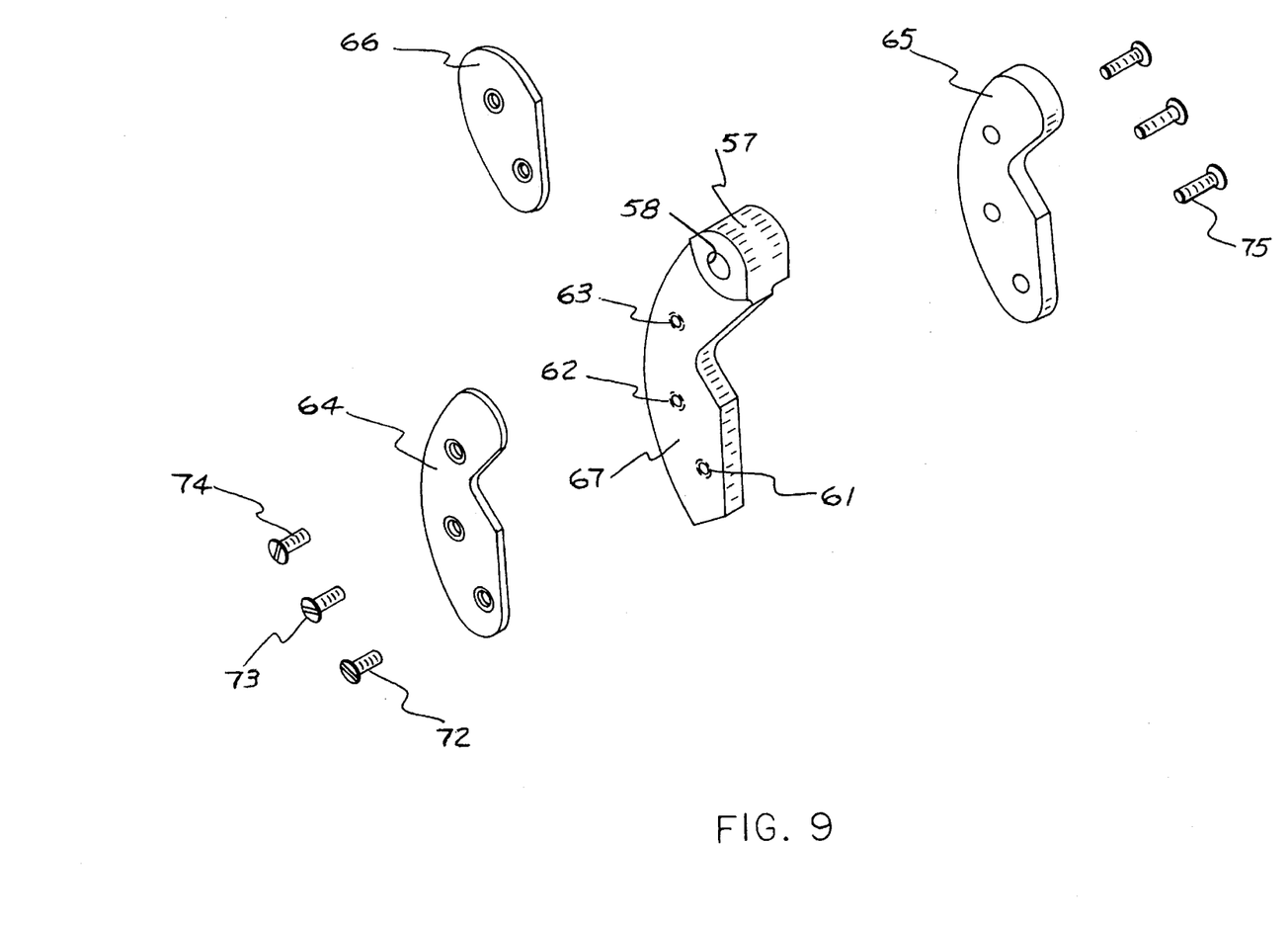
FIG. 9 is an expanded view of a second embodiment of an adjustable camweight system constructed in accordance with the principles of the present invention.
Figure 10:
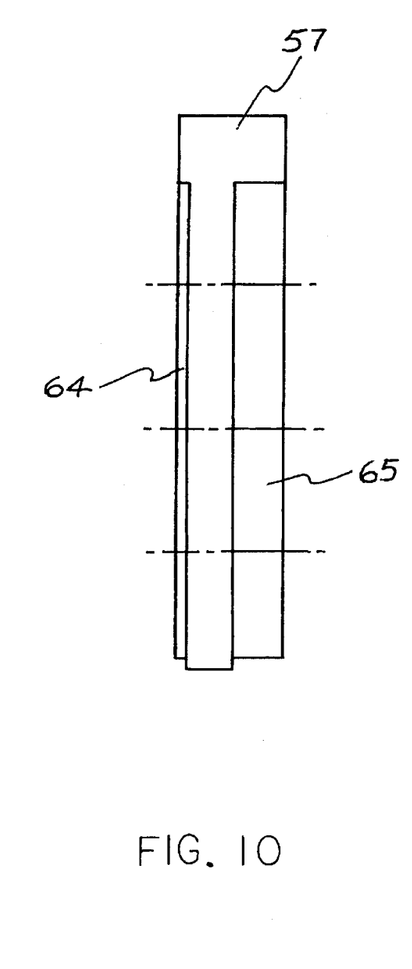
FIG. 10 is a rear elevation of the camweight system depicted in FIG. 9.
Figure 11:
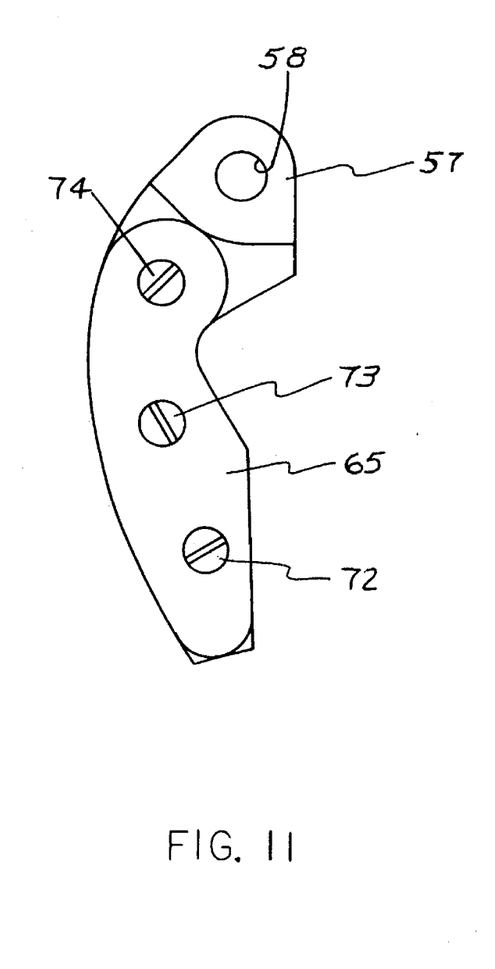
FIG. 11 is a side elevation of the camweight system depicted in FIG. 9.

As best seen in FIGS. 3–5, the first preferred embodiment of a camweight 40 according to the present invention includes a head 41 through which is formed a mounting bore 42. The outer surface 43 is generally curved and adapted for engagement with a spindle mounted on the spider tower. The outer end 44 is typically planar so that each cross sectional volume of the camweight 40 may be readily calculated. The inner surface 45 of the weight 40 may be planar or may include a hump 46 so as to obtain the desired moment of inertia characteristics.

Two methods of weight and moment of inertia adjustment are provided for camweight 40. First, a series of perforations 47, 48, 49 and 50 are formed near the bottom surface 44 of weight 40. When it is desired to remove mass from the arm 40, a cutting tool (not shown) can be positioned to engage the desired perforation and snip or cut off the desired segment. Typically, the tool would initially engage perforation 47, thereby removing segment 51 of the arm 40. The vehicle would then be operated to evaluate the effect on transmission performance, and additional segments could be removed as necessary.

A second method of weight adjustment is available when mass must be added to the arm 40. A series of bores 52, 53, 54 and 55 are formed into the arm 40 during its manufacture. When mass must be added to the arm 40 in the field, a suitable molten material, such as lead or tin, is poured into a bore, such as bore 55, and allowed to cure, a process that typically take less that ten seconds. The vehicle is then operated to determine the effect on transmission operation, and additional bores may be filled if required.

Referring now to FIGS. 6–11, a second embodiment of the present invention will now be discussed. A parent weight arm 56 is formed to include a head 57 having a bore 58. The bore 58 is adapted to receive the bolt 38 as shown in FIG. 2. The arm 56 is preferably formed of a sintered metal in order to achieve uniform density characteristics, but other materials may also be used if their mass distribution is predictable, and the arm can then be formed, for example, by a conventional CNC device. Joining the head 57 is a relatively slender cantilevered arm 59 having a varying cross section. The outer surface 60 is curved so as to be engageable with the torque button 37. Formed within the cantilevered arm 59 is a series of countersunk bores 61, 62 and 63. The bores 61–63 may be threaded, or they may be smooth depending on the type of fastening system used. A series of shims or washers 64, 65 and 66 may be attached to the cantilevered arm 59. Note in FIG. 7 that the arm 59 is not centered with respect to head 57. This creates a relatively narrow region adjacent to surface 67 of arm 59 that is defined by the volume formed by the intersection of the perpendicular projections of surface 67 and the surface 68 underlying head 57. Ideally, no part of the cantilevered arm 59 or any attachments thereto should extend beyond the edge 69 of head 57. Similarly, the opposite surface 70 of arm 59 is one boundary of a volume defined by the intersection of its perpendicular projection with the projection of surface 71 which underlies head 57. In an alternate embodiment, the arm 59 can be centered with respect to head 57, thereby creating regions having substantially equal projected volumes on either side of the arm 59.

In order to adjust the mass of the arm 59, a shim 64, for example, may be mounted to the surface 67. A series of shims similar to shim 64 but having varying thicknesses may be tried to obtain optimum transmission performance, with the thickest shim not exceeding the width of surface 68. If less mass is needed, or the moment of inertia needs adjustment, a shim or washer 66 having less surface area may be used. Shim 66 may be mounted so as to overlie either bores 61 and 62 or bores 62 and 63. Either of shims 64 or 66 may be affixed to the surface 67 by means of screw 72, 73 and 74.

If substantially more mass must be added to arm 59 in order to achieve the desired results, a thicker or wider shim or washer 65 may be mounted so as to abut surface 70. If both shim 65 and shim 64 are to be mounted to the arm 59, the screw 72, for example, may have a hollow, tapped bore into which the corresponding screw 75 may be inserted.

I claim:

1. A variable speed belt transmission, comprising:

(a) a driving clutch, the driving clutch being adapted for mechanical interconnection with a prime mover;

(b) a continuous belt, the continuous belt being mechanically interconnected to the driving clutch;

(c) a driven clutch, the driven clutch being mechanically interconnected with the continuous belt so as to receive energy from the driving clutch; and (d) at least one adjustable mass camweight, the adjustable mass camweight being pivotably mounted to the driving clutch, the adjustable mass camweight being adapted to permit adjustment of the camweight mass while the camweight is pivotably mounted to the driving clutch.

2. The variable speed belt transmission of claim 1, wherein the camweight further comprises:

(a) a cantilevered arm, the cantilevered arm having a first, pivotably supported end and a second, free end, the cantilevered arm having a perimeter; and (b) at least one score line, the score line extending circumferentially about the perimeter of the cantilevered arm, thereby facilitating removal of a volume of the cantilevered arm residing between the score line and the second, free end.

3. The variable speed belt transmission of claim 2, wherein the camweight comprises a series of parallel score lines spaced at intervals from the second, free end of the cantilevered arm, thereby defining a series of substantially planar cross sectional volumes of the cantilevered arm which may be removed from the cantilevered arm.

4. The variable speed belt transmission of claim 3, wherein the cantilevered arm further comprises at least one bore, the bore extending through the cantilevered arm in a region of the arm residing between the first end of the arm and the series of parallel score lines.

5. The variable speed belt transmission of claim 4, further comprising a cured, flowable material, the cured, flowable material residing within the bore so as to increase the mass of the cantilevered arm.

6. The variable speed belt transmission of claim 1, wherein the adjustable mass camweight comprises:

(a) a head, the head being formed to include a laterally extending bore, the head having a first width; and (b) an arm, the arm being integrally formed with the head, the arm having a sidewall having a first surface area, the arm having a second width, the second width being less than the first width.

7. The variable speed belt transmission of claim 6, further comprising at least one shim, the shim having a third width, the third width being less than the second width.

8. The variable speed belt transmission of claim 7, wherein the shim has a second surface area, the second surface area being less than the first surface area of the arm sidewall.

9. The variable speed belt transmission of claim 8, wherein the arm is formed to include at least one lateral bore, the shim residing in a region overlying the bore.

10. The variable speed belt transmission of claim 9, wherein the head of the camweight has a midpoint, and the arm of the camweight has a longitudinal axis, the camweight being formed such that the longitudinal axis of the arm does not intersect the midpoint of the camweight head.

* * * * *